United States Patent [19]
Spauschus et al.

[11] Patent Number: 6,073,454
[45] Date of Patent: Jun. 13, 2000

[54] REDUCED PRESSURE CARBON DIOXIDE-BASED REFRIGERATION SYSTEM

[75] Inventors: Hans O. Spauschus, Stockbridge, Ga.; Ullrich Hesse, Affalterbach, Germany

[73] Assignee: Spauschus Associates, Inc., Stockbridge, Ga.

[21] Appl. No.: 09/113,888

[22] Filed: Jul. 10, 1998

[51] Int. Cl.[7] .................................................. F25B 41/00
[52] U.S. Cl. ............................... 62/114; 62/101; 62/109; 62/112; 62/476; 62/483
[58] Field of Search ............................. 62/101, 109, 112, 62/476, 114, 483

[56] References Cited

U.S. PATENT DOCUMENTS

| | | |
|---|---|---|
| 2,889,691 | 6/1959 | Schjolin . |
| 4,037,426 | 7/1977 | Rojey . |
| 4,205,532 | 6/1980 | Brenan . |
| 4,433,554 | 2/1984 | Rojey et al. . |
| 4,439,996 | 4/1984 | Frohbieter . |
| 4,442,677 | 4/1984 | Kauffman . |
| 4,448,031 | 5/1984 | Rojey et al. ............................ 62/101 |
| 4,531,374 | 7/1985 | Alefeld . |
| 4,598,556 | 7/1986 | Mokadam . |
| 4,631,926 | 12/1986 | Goldshtein et al. . |
| 4,674,297 | 6/1987 | Vobach . |
| 4,679,403 | 7/1987 | Yoshida et al. . |
| 4,702,086 | 10/1987 | Nunn, Sr. et al. ....................... 62/113 |
| 4,707,996 | 11/1987 | Vobach . |
| 4,724,679 | 2/1988 | Radermacher ........................... 62/101 |
| 4,793,940 | 12/1988 | Borde et al. ............................ 252/69 |
| 4,967,566 | 11/1990 | Bergmann et al. . |
| 5,042,262 | 8/1991 | Gyger et al. . |
| 5,050,392 | 9/1991 | Messmer . |
| 5,245,836 | 9/1993 | Lorentzen et al. ....................... 62/174 |
| 5,636,520 | 6/1997 | Spauschus et al. . |

FOREIGN PATENT DOCUMENTS

| | | |
|---|---|---|
| 953 378 | 11/1956 | Germany . |
| 28 01 529 | 1/1978 | Germany . |
| 28 50 403 | 11/1978 | Germany . |
| 31 00 019 | 1/1981 | Germany . |

OTHER PUBLICATIONS

Cheron, J., "Development of a Resorption/Debsorption Heat Pump: Study of Solute/Solvent Couple," Anonymous, France: 1984.

Davis, Richard A., et al, "Kinetics of the Reaction of Carbon Dioxide with Secondary Amines in Polyethylene Glycol," *Chemical Engineering Science*, vol. 48, No. 18, pp. 3187–3193, 1993.

Koehler, Juergen, et al, "Carbon Dioxide as a Refrigerant for Vehicle Air–Conditioning with Application to Bus Air–Conditioning," p. 376–385, publication unknown.

Merkley, K. E., et al, "Enthalpies of Absorption of Carbon Dioxide in Aqueous Methyldiethanolamine Solutions," *Thermochem.Acta* 121:437, 1987.

Murrieta–Guevara, Florentino, et al, "Solubility of Carbon Dioxide in Binary Mixtures of N–Methylpyrrolidone and Alkanolamines," *J. Chem.Eng.Data* 37:4–7, 1992.

(List continued on next page.)

*Primary Examiner*—Henry Bennett
*Assistant Examiner*—Mark Shulman
*Attorney, Agent, or Firm*—Jones & Askew LLP

[57] ABSTRACT

There is disclosed an novel refrigeration apparatus and a method of refrigeration. The novel refrigeration apparatus comprises a desorber/evaporator, a scroll compressor operatively connected to said desorber/evaporator, a resorber/condenser operatively connected to said compressor, an expansion device operatively connected to said resorber/condenser and to said desorber/evaporator and a circulating refrigerant comprising carbon dioxide and a liquid co-fluid in which the carbon dioxide is differentially soluble. The refrigeration method comprises compressing carbon dioxide gas and a liquid co-fluid in a scroll compressor to an increased pressure, such that carbon dioxide at least partially dissolves in the liquid co-fluid, and reducing the pressure on the liquid co-fluid containing the dissolved carbon dioxide so that dissolved carbon dioxide comes out of solution with the liquid co-fluid, and recirculating the gaseous carbon dioxide and liquid co-fluid to the scroll compressor.

32 Claims, 1 Drawing Sheet

OTHER PUBLICATIONS

Murrieta–Guevara, Florentino, et al, "Solubility of Carbon Dioxide in Binary Mixtures of N–Methylpyrrolidone and Alkanolamines," *J. Chem.Eng.Data* 37:4–7, 1992.

Murrieta–Guevara, Florentino, et al, "Solubilities of Carbon Dioxide and Hydrogen Sulfide in Propylene Carbonate, N–Methylpyrrolidone and Sulfolane," *Fluid Phase Equilibria* 44:105–115, 1988.

Oscarson, J.L., et al, "Enthalpies of Absorption of Carbon Dioxide in Aqueous Diethanolamine Solutions," *Thermochim.Acta* 146:107, 1989.

Pitzer, K.S., et al, "Equations of State Valid Continuously from Zero to Extreme Pressures with H2O and CO2 as Examples," *International Journal of Thermophysics*, 16:511, 1995.

Rivas, O.R., et al, "Sweetening of Sour Natural Gases by Mixed–Solvent Absorption: Solubilities of Ethane, Carbon Dioxide, and Hydrogen Sulfide in Mixtures of Physical and Chemical Solvents," *AIChE Journal* 25:975, 1979.

Robinson, D.M., et al, "Using Carbon Dioxide as a Transcritical Vapor Compression Refrigeration Cycle," Proceedings of the 1996 International Refrigeration Conference at Purdue University, Jul. 23–26, 1996, p 329–336.

Tyagi, K.P., "Heat of Mixing of Some Refrigerant–Absorbent Combination," *Indian Journal of Technology*, 14:167, 1976.

Wertenbach, J., "High Pressure Refrigeration System with CO2 in Automobile Air–Conditioning," Presented at Tronheim Workshop, May 13–14, 1997.

REDUCED PRESSURE CARBON DIOXIDE-BASED REFRIGERATION SYSTEM

FIELD OF INVENTION

The present invention relates generally to refrigeration systems, and, more specifically, to refrigeration systems that use carbon dioxide as the refrigerant. More particularly the present invention relates to a refrigeration system using carbon dioxide and a co-fluid that operates at reduced pressures compared to conventional carbon dioxide-based refrigeration systems.

BACKGROUND OF THE INVENTION

Refrigeration systems are prevalent in our everyday life. Refrigeration systems can be found in such varied locations as automobiles, commercial and residential refrigerators and freezers, commercial and residential air conditioning systems, supermarket display cases and many other applications.

The most widely used cycle for air-conditioning systems and refrigeration plants is the vapor compression refrigeration cycle. In this cycle the refrigerant in the vapor phase is compressed in a compressor, causing an increase in temperature. The hot, high pressure refrigerant is then circulated through a heat exchanger, called a condenser, where it is cooled by heat transfer to the surrounding environment. As a result of the heat transfer to the environment, the refrigerant condenses from a gas to a liquid. After leaving the condenser, the refrigerant passes through a throttling device where the pressure and temperature both are reduced. The cold refrigerant leaves the throttling device and enters a second heat exchanger, called an evaporator, located in the refrigerated space. Heat transfer in the evaporator causes the refrigerant to evaporate or change from a saturated mixture of liquid and vapor into a superheated vapor. The vapor leaving the evaporator is then drawn back into the compressor, and the cycle is repeated. A variation of the vapor compression cycle as outlined above is the transcritical carbon dioxide vapor compression cycle where the condenser is replaced with an ultra-high pressure gas cooler and phase change does not occur.

The phase out of CFC-12, under the terms of the 1987 Montreal Protocol on Substances that Deplete the Ozone Layer is affecting an immediate shift away from chlorofluorocarbons ("CFCs") in refrigeration systems toward hydrofluorocarbon refrigerants ("HFCs"), such as HFC-134a, a substitute refrigerant with no ozone depletion potential. More recently, concerns have arisen regarding the potential contribution of man-made refrigerant gases to Global Warming (D. L. Albritton, Ozone Depletion And Global Warming, Proceedings of the ASHRAE/NIST Refrigerants Conference, October 1997). For example, HFC-134a, which is widely used as refrigerant for automotive air-conditioning, domestic refrigerators, small stationary equipment, medium temperature supermarket cases and industrial and commercial chillers has a 100 year Global Warming Potential of 1200 times that of carbon dioxide. Therefore, the search for refrigerants that are environmentally friendly continues.

Carbon dioxide meets all environmental requirements. It is non-toxic, non-flammable, abundantly available and inexpensive. Recently, significant attention has been directed to a transcritical carbon dioxide cycle. J. Pettersen, An Efficient New Automobile Air-Conditioning System Based on $CO_2$ Vapor Compression, ASHRAE Transactions, Vol. 100, Pt. 2 (1994); J. Wertenbach, J. Maue and W. Volz, "$CO_2$ Refrigeration Systems in Automobile Air Conditioning", Proceedings, International Conference on Ozone Protection Technologies, Washington, D.C. October (1996). A major disadvantage to the operation of the transcritical carbon dioxide cycle is that the components must be redesigned to withstand ultra-high pressures. Furthermore, the question of leakage control at high pressures, such as 120 bar, has not been resolved.

Scientific and engineering papers and patent reviews reveal a historic interest in hybrid cycles going back to the 1930s under headings such as vapor compression/absorption cycle, compressor systems with solution cycle and chemically assisted mechanical refrigeration systems. See for example U.S. Pat. Nos. 2,889,691; 3,277,659; 4,037,426; 4,433,554; 4,442,677; 4,448,031; 4,598,556; 4,674,297; 4,707,996; 4,724,679; 4,967,566; 5,050,392; and 5,245,836. The goals of this earlier work were to improve on the efficiency of existing absorption or vapor compression cycles. These hybrid cycles were conceptual in nature and no reduction to practice has been reported. U.S. Pat. No. 4,707,996, issued to A. Vobach in 1987, discloses a refrigeration system using refrigerant and a solvent as working fluid. The refrigerants proposed for this system include hydrocarbons, halogenated hydrocarbons and a long list of other low boiling chemical products including ammonia, carbon monoxide and carbon dioxide. The "solvents" cited by Vobach include a long list of organic chemicals. The refrigeration mechanism includes a compressor, a mixer-condenser, an expansion valve, and an evaporator. Compressed refrigerant gas dissolves in the solvent, and releases heat to the surroundings at the mixer-condenser. At the evaporator, the dissolved refrigerant comes out of solution as a gas, again. In the process, heat is absorbed from the surroundings by the refrigerant. At the evaporator two streams are formed; a first stream of refrigerant gas, and a second stream of liquid solvent. Both streams are separately returned to the compressor where they are combined and the refrigerant gas is compressed to complete the cycle, again. The compressor is disclosed as a rotary, a centrifugal or a rotary screw-type. Specific compressors cited in the Vobach patent include a multi-stage centrifugal machine produced by York or Sihi, helical or rotary screw compressor from Dunham-Bush, a Wankel-type compressor manufactured by Ogura Clutch of Japan and the rolling piston compressors of Rotorex (Fedders) or Mitsubishi. The solvents disclosed by Vobach as being useful include an ether, an ester, an amide, an amine or polymeric derivatives of these; for example, dimethyl formamide and dimethyl ether of tetraethylene glycol as well as halogenated hydrocarbons, such as carbon tetrachloride and dichlorethylene, halogenated salts, such as lithium bromide; methanol; ethanol; acetone; chloroform; trichloroethane; propylene carbonate; sulfolane and other organic liquids containing combined oxygen.

At first glance, the Vobach refrigeration system looks promising. However, in Vobach's final report to the United States Department of Energy he reports that his attempts to operate a system based on his disclosed technology were unsuccessful (A. Vobach, "Development of a Chemically Assisted Mechanical Refrigeration Cycle", Final Report, DOE/R6/12081-TI, Oct. 20, 1983). In view of the present invention, this is not surprising. The refrigeration system disclosed in Vobach is inadequate for several reasons. First, as the present invention has discovered, the use of a compressor of the rotary, centrifugal or reciprocating type would not function, or would fail quickly, due to the feeding of the liquid solvent through the compressor. Second, Vobach's choices of solvents for the refrigerants listed, and specifically for carbon dioxide, are environmentally unacceptable or provide only marginal cooling capacity and efficiency.

Therefore, a need exists for a carbon dioxide-based refrigeration system that operates in conventional refrigeration apparatus at conventional pressures (<35 bar) and provides improved cooling capacities.

SUMMARY OF THE INVENTION

The present invention satisfies the above-described needs by providing a novel refrigeration system. The novel refrigeration method of the present invention comprises compressing carbon dioxide gas and a liquid co-fluid to an increased pressure in a scroll compressor, dissolving the compressed carbon dioxide gas in a liquid co-fluid, reducing the pressure on the liquid co-fluid containing the dissolved carbon dioxide such that dissolved carbon dioxide comes out of solution with said liquid co-fluid, and returning the liquid co-fluid and the gaseous carbon dioxide to the compressor where the gaseous carbon dioxide gas and liquid co-fluid are again compressed. The co-fluid is selected from the group of neopentylglycols, glycol ethers, glycol esters, pyrrolidones, butyrolactones, adipates, carbonates, and mixtures thereof.

In another embodiment, the vapor compression refrigeration system of the present invention comprises a scroll compressor having an inlet and an outlet, the compressor being for compressing gaseous refrigerant and for circulating refrigerant and liquid co-fluid through the refrigeration system; a condenser connected to the outlet of the compressor; an expansion device connected to the condenser; an evaporator connected to the expansion device, and the evaporator being connected to the inlet of the compressor, such that a stream of carbon dioxide gas and liquid co-fluid can be circulated through said scroll compressor.

Accordingly, it is an object of the present invention to provide an improved refrigeration system.

Another object of the present invention is to provide a refrigeration system that uses a more environmentally friendly refrigerant.

A further object of the present invention is to provide a carbon dioxide-based refrigeration system that operates at reduced pressures compared to conventional carbon dioxide-based refrigeration systems.

Another object of the present invention is to provide a carbon dioxide-based refrigeration system that will operate with existing refrigeration components.

Yet another object of the present invention is to provide a carbon dioxide-based refrigeration system which operates at pressures comparable to CFC and HFC-based refrigeration systems.

Another object of the present invention is to provide a carbon dioxide-based refrigeration system that will provide improved cooling capacities.

Still another object of the present invention is to provide a carbon dioxide-based refrigeration system wherein the co-fluid also provides lubrication for the compressor.

A further object of the present invention is to provide a carbon dioxide-based refrigeration system that has no risk to the environment in the event of refrigerant leakage.

These and other objects, features and advantages of the present invention will become apparent after a review of the following detailed description of the disclosed embodiments and the appended drawing and claims.

DESCRIPTION OF THE DISCLOSED EMBODIMENTS

Figure 1:
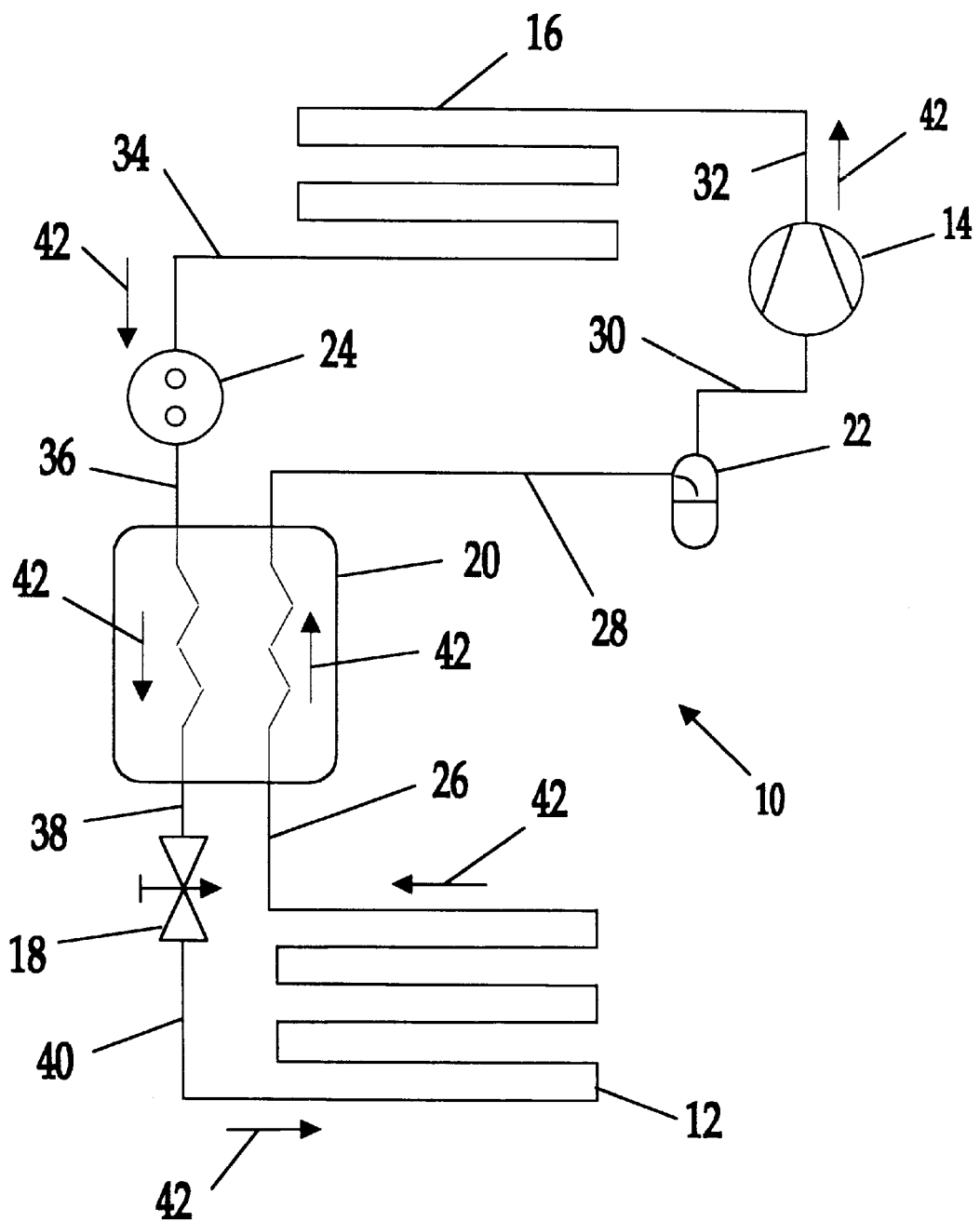
FIG. 1 is a schematic diagram of a disclosed embodiment of the refrigeration system of the present invention.

With reference to the drawing in which like numbers indicate like elements throughout the several views, it can be seen that there is a refrigeration system 10 comprising a desorber/evaporator 12, a refrigerant vapor scroll compressor 14, a resorber/condenser 16 and an expansion device 18. Optionally, the refrigeration system 10 can include an internal heat exchanger 20, an accumulator 22 and a sight glass 24. The evaporator 12 is operatively connected to the heat exchanger 20 by a pipe or tube 26. The heat exchanger 20 is operatively connected to the accumulator 22 by a pipe or tube 28. The accumulator 22 is operatively connected to the scroll compressor 14 by a pipe or tube 30. The scroll compressor 14 is operatively connected to the resorber/condenser 16 by a pipe or tube 32. The resorber/condenser 16 is operatively connected to the sight glass 24 by a pipe or tube 34. The sight glass 24 is operatively connected to the heat exchanger 20 by a pipe or tube 36. The heat exchanger 20 is operatively connected to the expansion device 18 by a pipe or tube 38. The expansion device 18 is operatively connected to the desorber/evaporator 12 by a pipe or tube 40. A carbon dioxide refrigerant and co-fluid are circulated around the refrigeration system 10 in the direction shown by the arrows 42.

It will be appreciated by those skilled in the art that carbon dioxide is differentially soluble in the liquid co-fluid. As used herein the term differentially soluble means that the solubility of carbon dioxide in the liquid co-fluid differs depending upon the pressure exerted on the mixture. In other words, at one pressure, the carbon dioxide is easily soluble in the co-fluid, and at a relatively lower pressure, the carbon dioxide is less soluble in the liquid co-fluid.

The co-fluid that is used in the present invention is an essential aspect of the present invention. The essential features of the co-fluid are that the carbon dioxide refrigerant must be rapidly soluble in the co-fluid in order to quickly approach equilibrium solubility; the co-fluid must be stable at high temperatures, such as 150° C., with respect to carbon dioxide and metals; the co-fluid must have good thermal properties, heat capacity and heat transfer coefficient; the co-fluid must have a large differential solubility with respect to carbon dioxide between high side (resorber/condenser) and low side (desorber/evaporator); and the carbon dioxide/co-fluid must have a high heat of mixing. Other desirable properties of the co-fluid are low vapor pressure relative to carbon dioxide, relatively low viscosity and low density, good mechanical lubrication properties, low toxicity, TSCA registration, relatively low flammability, and relatively low flash point.

The specifications of co-fluids useful in the present invention are shown in Table 1 below:

TABLE 1

| Co-Fluid Property | Specification |
| --- | --- |
| Toxicity | Non-toxic |
| Flammability | Non-flammable |
| Normal Boiling Point | >50° C. |
| Density | 0.8 to 1.2 g/cc |
| Viscosity | <10 cSt at 40° C. |
| $CO_2$ Miscibility | Miscible, 5% to 50% $CO_2$, −20 to 100° C. |
| $CO_2$ Solubility | Saturation Pressure, 10% $CO_2$, <15 bar at 40° C. |

TABLE 1-continued

| Co-Fluid Property | Specification |
|---|---|
| Thermal Stability | No significant reaction with $CO_2$ and metals; 14 days at 125° C. |

As stated above, it is an essential property of the co-fluids useful in the present invention that carbon dioxide must be readily soluble in the co-fluid. An example of ready solubility is the fact that when carbon dioxide is readily soluble in the co-fluid, the equilibrium vapor pressure of 10% by weight carbon dioxide dissolved in the co-fluid is reduced to between approximately 6 and 15 bar at 40° C.

Examples of co-fluids having the foregoing properties that are useful in the present invention include neopentylglycols, glycol ethers, glycol esters, pyrrolidones, butyrolactones, adipates, carbonates, and mixtures thereof. Neopentylglycols are available from Unitex Chemical Corporation, Greensboro, N.C., and an adipate useful in the present invention is also available from Unitex Chemical Corporation, under the trade name Uniplex 165. Butyrolactones, carbonates, glycol ethers and esters and pyrrolidones useful in the present invention are available from Arco Chemical Company, Newton Square, Pa., under the trade names NMP™, GBL™, ARCONATE® 1000, ARCOSOLV®D P M, ARCOSOLV® DPNP, ARCOSOLV® DPNB, ARCOSOLV® TP, and ARCOSOLV® DPMA.

Preferred co-fluids useful in the present invention include neopentylglycol diacetate, diisobutyl adipate, gamma butyrolactone, propylene carbonate, dipropyleneglycol methyl ether, N-methyl-2-pyrrolidone, dipropyleneglycol methyl ethyl acetate, tripropyleneglycol methyl ether, dipropyleneglycol n-butyl ether, dipropyleneglycol n-propyl ether and mixtures thereof. Particularly preferred co-fluids useful in the present invention comprise neopentylglycols, such as, neopentylglycol diacetate; pyrrolidones, such as, N-methyl-2-pyrrolidone; dipropyleneglycol acetates, such as dipropyleneglycol methyl ether acetate and mixtures thereof.

The chemical structures of some of the co-fluids useful in the present invention are shown below in Table 2.

TABLE 2

| Chemical Name | Structure |
|---|---|
| Neopentylglycol Diacetate | $(CH_3)_2C(CH_2OCCH_3)_2$ with C=O |
| Diisobutyl Adipate | $(CH_3)_2CHCH_2OC(CH_2)_4COCH_2CH(CH_3)_2$ with C=O groups |
| Gamma Butyrolactone | (cyclic structure with O and C=O) |
| Propylene Carbonate | (cyclic structure with $CH_3$, O, O, C=O) |

TABLE 2-continued

| Chemical Name | Structure |
|---|---|
| Dipropyleneglycol Methyl Ether | $CH_3CHCH_2OCH_2CH$ with OH and $OCH_3$, $CH_3$ |
| N-Methyl-2-Pyrrolidone | (pyrrolidone ring with N-$CH_3$, C=O) |
| Dipropyleneglycol Methyl Ether Acetate | $CH_3CHCH_2OCH_2CH$ with $OCCH_3$ (C=O) and $OCH_3$, $CH_3$ |
| Tripropyleneglycol Methyl Ether | $CH_3OCH_2CHOCH_2CHOCH_2$ with $CH_3$, $CH_3$ branches, H—C—$CH_3$, OH |
| Dipropyleneglycol n-Butyl Ether | $CH_3CHCH_2OCH_2CHCH_3$ with OH and $O(CH_2)_3CH_3$ |
| Dipropyleneglycol n-Propyl Ether | $CH_3CHCH_2OCH_2CHO(CH_2)_2CH_3$ with OH and $CH_3$ |

Operation of the refrigeration apparatus 10 will now be considered. A mixture of gaseous carbon dioxide and liquid co-fluid is compressed to an elevated pressure in the scroll compressor 14. The mixture travels from the compressor 14 to the resorber/condenser 16 through the pipe or tube 32. Since carbon dioxide is soluble in the co-fluid, the gaseous carbon dioxide at least partially, and preferably completely, dissolves in the liquid co-fluid in the resorber/condenser 16. In the resorber/condenser 16, the refrigeration fluids therefore undergo a phase change. Prior to the resorber/condenser 16 there are primarily two phases: the gaseous carbon dioxide phase and the liquid co-fluid phase (which may also contain a relatively low level of dissolved carbon dioxide). In the resorber/condenser 16, there is primarily a single liquid phase comprising the co-fluid and the dissolved carbon dioxide. The action of the carbon dioxide dissolving in the co-fluid releases the heat of solution. The heat of solution is then dissipated to the surroundings of the resorber/condenser 16.

The liquid co-fluid containing the dissolved carbon dioxide flows from the resorber/condenser 16 to the expansion device 18 through the sight glass 24, pipe 42, pipe 36, internal heat exchanger 20 and pipe 38. The expansion device 18 reduces the pressure of the co-fluid containing the dissolved carbon dioxide. At reduced pressure, a portion of the dissolved carbon dioxide will boil out of the co-fluid, and thus reduces the temperature of the carbon dioxide/co-fluid mixture. The co-fluid containing dissolved carbon dioxide then flows from the expansion device to the desorber/ evaporator 12 through the pipe or tube 40. Since the pressure on the co-fluid containing the dissolved carbon dioxide is reduced in the desorber/evaporator 12, the boiling point or temperature of dissolution of the dissolved carbon dioxide in the co-fluid is reduced. Therefore, as the co-fluid containing the dissolved carbon dioxide absorbs heat from the surroundings of the desorber/evaporator 12, the absorbed heat causes the dissolved carbon dioxide to evaporate or come out of solution with the co-fluid. The quantity of carbon dioxide that comes out of solution is determined by the temperature and pressure of the co-fluid and on the nature of the co-fluid. The single liquid phase of the co-fluid containing the dissolved carbon dioxide changes to a two-phase system comprising liquid co-fluid with a reduced amount of dissolved carbon dioxide and gaseous carbon dioxide.

The absorption of heat at the desorber/evaporator 12 in order to affect the phase change of the refrigerant contained therein can be utilized in numerous manners well known to those skilled in the art, such as to provide refrigeration for a climate control system in a car, small stationary equipment, supermarket refrigerated cases and commercial and industrial chillers.

The gaseous carbon dioxide and the liquid co-fluid flow from the evaporator 12 to the accumulator 22 through the pipe 26, the internal heat exchanger 20 and the pipe 28. The accumulator functions as a reservoir of gaseous carbon dioxide and liquid co-fluid to feed the compressor 14. The gaseous carbon dioxide and the liquid weak solution of carbon dioxide and co-fluid flow from the accumulator 22 to the compressor 14 through the pipe 30; whereupon, the refrigeration cycle begins again.

As stated above, the refrigeration system 10 can optionally include an internal heat exchanger 20. The purpose of the internal heat exchanger 20 is to provide sufficient cooling to lower the temperature of the carbon dioxide/co-fluid mixture to a point where the reduction of pressure by the expansion valve will yield the required cooling temperature. The function of the internal heat exchanger 20 is to transfer heat from the fluid flowing from the resorber/condenser 16 to the expansion device 18 to the fluid flowing from the desorber/evaporator 12 to the accumulator 22. Internal heat exchangers are well known to those skilled in the art, and there is nothing critical about the particular design of the internal heat exchanger 20.

The compressor 14 can be driven by any suitable means (not shown), such as an automotive internal combustion engine, a stationary gas engine or an electric motor. It is specifically contemplated that the refrigeration system 10 of the present invention is especially well suited for use in mobile (automobile, truck or bus) climate control systems; however, the cooling cycle can serve equally well for stationary refrigeration or air conditioning applications.

Conventional transcritical carbon dioxide-based refrigeration systems operate at ultra-high pressures. The use of the co-fluid in accordance with the present invention, however, permits the operating pressure of the refrigeration system to be reduced to conventional pressures associated with CFC-based, HCFC-based and HFC-based refrigeration systems. In fact, the refrigeration system of the present invention permits the use of existing refrigeration apparatus or components with little or no modification. Furthermore, the use of conventional operating pressures, 35.0 bar or less, in accordance with the present invention greatly reduces the problem of refrigerant leakage associated with prior art carbon dioxide-based refrigeration systems using the conventional transcritical cycle which operates at a maximum pressure of 120 bar (1740 psia) or greater.

The structure and properties of the co-fluid and the ratio of the amount of co-fluid to carbon dioxide used in the refrigeration system 10 determine the pressure of the system. However, it is specifically contemplated that the operating pressure of the refrigeration system of the present invention should be between approximately 15 and 35 bar as measured at the high side of the system (i.e.; between the compressor 14 and the resorber/condenser 16). The amount of co-fluid that is useful in the present invention is between approximately 5% and 50% by weight carbon dioxide based on co-fluid measured after the resorber/condenser 16.

The use of a scroll-type compressor in the present invention is a critical aspect of the present invention. It is not sufficient for the present invention to use compressors used in prior art carbon dioxide-based refrigeration systems, such those disclosed in U.S. Pat. No. 4,707,996 (the disclosure of which is incorporated herein by reference). Scroll compressors are orbital motion, positive displacement machines that compress the refrigerant with two interfitting, spiral-shaped scroll members. Scroll compressors useful in the present invention are commercially available from numerous sources, including open scroll compressors for automotive air conditioning from Sanden International (U.S.A.), Inc., Hitachi, Ltd., Tochigi-Ken, Japan and from Ford Motor Company, Dearborn, Mich. Scroll compressors for stationary refrigeration and air conditioning systems are well known in the art and are produced by Copeland Corporation, Carlyle-Carrier, Trane, Matsushita, Mitsubishi Electric, Daikin, Toshiba, Sanyo and Mitsubishi Heavy Industries.

The use of a scroll compressor is essential to the operability of the present invention because the liquid co-fluid contained in the refrigeration system 10 flows through and is pumped through the refrigeration system by the scroll compressor. The volume of liquid that flows through the scroll compressor of the present invention would cause conventional compressors used in prior art carbon dioxide-based refrigeration systems, such as rotary and reciprocating compressors, to fail immediately or after only a short period of operation. The scroll compressor used in the present invention, however, is specifically contemplated and designed to pump co-fluids, as well as compressed gaseous carbon dioxide.

A full-scale test system was designed, constructed and operated to simulate the complete range of automotive air conditioning operating parameters, air-side and refrigerant-side. Performance of the low pressure carbon dioxide system of the present invention was compared to calibration runs with HFC-134a, as used in present vapor compression technology. Results of tests for three co-fluids at three different automotive air conditioning system operating conditions are given in Table 3 below.

TABLE 3

Performance Comparison

| Vehicle Speed | Ambient Temperature | R134a | NPGDA | DIAD | NMP |
|---|---|---|---|---|---|
| | | Cooling Capacity, kW | | | |
| Idle | hot | 2.53 | 1.72, | 1.78 | 1.95 |
| Moderate | warm | 2.22 | 2.28 | 1.66 | 2.00 |
| Highway | cool | 1.93 | 2.20 | 1.12 | 1.71 |

TABLE 3-continued

Performance Comparison

| Vehicle Speed | Ambient Temperature | R134a | NPGDA | DIAD | NMP |
|---|---|---|---|---|---|
| | | Coefficient of Performance (COP) | | | |
| Idle | hot | 1.72 | 0.87 | 0.90 | 1.24. |
| Moderate | warm | 1.19 | 0.57 | 0.41 | 0.78 |
| Highway | cool | 0.75 | 0.43 | 0.22 | 0.52 |

NPGDA = neopentylglycol diacetate
DIAD = diisobutyl adipate
NMP = N-methyl-2-pyrrolidone The foregoing test results demonstrate that the present invention can accomplish, under certain condition, cooling capacities that are better than R134a and coefficients of performance approaching that of R134a.

It should be understood, of course, that the foregoing relates only to certain disclosed embodiments of the present invention and that numerous modifications or alterations may be made therein without departing from the spirit and scope of the invention as set forth in the appended claims.

What is claimed is:

1. A vapor compression refrigeration system comprising:
   an orbital motion scroll compressor having an inlet and an outlet, said scroll compressor being for compressing gaseous refrigerant and for circulating refrigerant and liquid co-fluid through said refrigeration system;
   a resorber/condenser connected to said outlet of said scroll compressor;
   an expansion device connected to said resorber/condenser; and
   a desorber/evaporator connected to said expansion device, said desorber/evaporator being connected to said inlet of said scroll compressor, such that a stream of refrigerant gas and liquid co-fluid can be circulated through said scroll compressor, said refrigeration system including a carbon dioxide refrigerant and a liquid co-fluid in which said carbon dioxide is differentially soluble, wherein said refrigeration system is operative at pressures of 35 bar or less.

2. The refrigeration system of claim 1 further comprising:
   a heat exchanger disposed between said resorber/condenser and said expansion device such that heat from said refrigerant and co-fluid flowing between said resorber/condenser and said desorber/evaporator is at least partially transferred to said refrigerant and co-fluid flowing from said desorber/evaporator to said compressor.

3. The refrigeration system of claim 1, wherein said co-fluid is selected from the group of neopentylglycols, glycol ethers, glycol esters, pyrrolidones, butyrolactones, adipates, carbonates, and mixtures thereof.

4. The refrigeration system of claim 1, wherein said co-fluid is selected from the group of neopentylglycol diacetate, diisobutyl adipate, gamma butyrolactone, propylene carbonate, dipropyleneglycol methyl ether, N-methyl-2-pyrrolidone, dipropyleneglycol methyl ethyl ether acetate, tripropyleneglycol methyl ether, dipropyleneglycol n-butyl ether, dipropyleneglycol n-propyl ether and mixtures thereof.

5. The refrigeration system of claim 1, wherein said co-fluid is N-methyl-2-pyrrolidone.

6. A refrigeration method comprising the steps of:
   (a) compressing a stream of carbon dioxide gas and a liquid co-fluid to an increased gas pressure with a scroll compressor, such that said compressed carbon dioxide gas at least partially dissolves in said liquid co-fluid at pressures of 35 bar or less, such that the heat of solution is at least partially released from said solution;
   (b) reducing the pressure on said liquid co-fluid containing said dissolved carbon dioxide, such that dissolved carbon dioxide comes at least partly out of solution with said liquid co-fluid and such that the heat of solution is at least partially absorbed from the surroundings by said vaporizing carbon dioxide; and
   (c) recirculating said stream of carbon dioxide gas and said liquid co-fluid to said scroll compressor.

7. The method of claim 6 further comprising the step of transferring at least a portion of the heat from said liquid co-fluid containing dissolved carbon dioxide to said recirculated stream of liquid co-fluid and carbon dioxide gas.

8. The method of claim 6, wherein said co-fluid is selected from the group of neopentylglycols, glycol ethers, glycol esters, pyrrolidones, butyrolactones, adipates, carbonates, and mixtures thereof.

9. The method of claim 6, wherein said co-fluid is selected from the group of neopentylglycol diacetate, diisobutyl adipate, gamma butyrolactone, propylene carbonate, dipropyleneglycol methyl ether, N-methyl-2-pyrrolidone, dipropyleneglycol methyl ethyl acetate, tripropyleneglycol methyl ether, dipropyleneglycol n-butyl ether, dipropyleneglycol n-propyl ether and mixtures thereof.

10. The method of claim 6, wherein said co-fluid is N-methyl-2-pyrrolidone.

11. A refrigeration method comprising the steps of:
    (a) compressing a stream of carbon dioxide gas and a liquid co-fluid in which said carbon dioxide gas is at least partially soluble to an increased gas pressure of 35 bar or less;
    (b) dissolving at least a portion of said compressed carbon dioxide in said liquid co-fluid; and
    (c) reducing the pressure on said liquid co-fluid containing said dissolved carbon dioxide such that dissolved carbon dioxide comes out of solution with said liquid co-fluid, said co-fluid comprising a pyrrolidone.

12. A refrigeration system comprising a desorber/evaporator, a scroll compressor operatively connected to said desorber/evaporator, a resorber/condenser operatively connected to said compressor, an expansion device operatively connected to said resorber/condenser and to said desorber/evaporator and a circulating refrigerant, the improvement comprising said refrigerant comprising carbon dioxide and a liquid co-fluid in which said carbon dioxide is differentially soluble at resorber/condenser and desorber/evaporator conditions, wherein said refrigeration system is operative at pressures of 35 bar or less.

13. The refrigeration system of claim 12, wherein said co-fluid is a pyrrolidone.

14. The refrigeration system of claim 12 further comprising an engine operatively associated with the scroll compressor.

15. The refrigeration system of claim 12 further comprising a motor operatively associated with the scroll compressor.

16. An apparatus comprising a desorber/evaporator, a scroll compressor operatively connected to said desorber/evaporator, a resorber/condenser operatively connected to said compressor, an expansion device operatively connected to said resorber/condenser and to said desorber/evaporator and a circulating refrigerant comprising carbon dioxide and a liquid co-fluid selected from the group of pyrrolidones, neopentylglycols, propyleneglycols and mixtures thereof, wherein said apparatus is operative at pressures of 35 bar or less.

17. An apparatus comprising an desorber/evaporator, a scroll compressor operatively connected to said desorber/evaporator, a resorber/condenser operatively connected to said compressor, an expansion device operatively connected to said resorber/condenser and to said desorber/evaporator and a circulating refrigerant comprising carbon dioxide and a liquid co-fluid selected from the group of N-methyl-2-pyrrolidone, neopentylglycol diacetate, diisobutyl adipate, dipropyleneglycol methyl ether acetate and mixtures thereof, wherein said apparatus is operative at pressures of 35 bar or less.

18. A method comprising the steps of compressing carbon dioxide gas and a liquid co-fluid in a scroll compressor to an increased pressure of 35 bar or less so as to dissolve said compressed carbon dioxide gas in said liquid co-fluid, and reducing the pressure on the liquid co-fluid containing the dissolved carbon dioxide so that dissolved carbon dioxide comes out of solution with the liquid co-fluid.

19. A method comprising the steps of compressing carbon dioxide gas and a liquid co-fluid in a scroll compressor to an increased pressure of 35 bar or less so as to dissolve said compressed carbon dioxide gas in said liquid co-fluid, and reducing the pressure on the liquid co-fluid containing the dissolved carbon dioxide so that dissolved carbon dioxide comes out of solution with the liquid co-fluid, said co-fluid being selected from the group of N-methyl-2-pyrrolidone, neopentylglycol diacetate, diisobutyl adipate, dipropyleneglycol methyl ether acetate and mixtures thereof.

20. A vapor compression refrigeration system comprising:
an orbital motion scroll compressor having an inlet and an outlet, said scroll compressor being for compressing gaseous refrigerant and for circulating refrigerant and liquid co-fluid through said refrigeration system;
a resorber/condenser connected to said outlet of said scroll compressor;
an expansion device connected to said resorber/condenser; and
a desorber/evaporator connected to said expansion device, said desorber/evaporator being connected to said inlet of said scroll compressor, such that a stream of refrigerant gas and liquid co-fluid can be circulated through said scroll compressor, said refrigeration system including a carbon dioxide refrigerant and a liquid co-fluid in which said carbon dioxide is differentially soluble and wherein said carbon dioxide is readily soluble in said co-fluid, thereby reducing the equilibrium vapor pressure of 10% by weight carbon dioxide dissolved in said co-fluid to between approximately 6 and 15 bar at 40° C.

21. A vapor compression refrigeration system comprising:
an orbital motion scroll compressor having an inlet and an outlet, said scroll compressor being for compressing gaseous refrigerant and for circulating refrigerant and liquid co-fluid through said refrigeration system;
a resorber/condenser connected to said outlet of said scroll compressor;
an expansion device connected to said resorber/condenser; and
a desorber/evaporator connected to said expansion device, said desorber/evaporator being connected to said inlet of said scroll compressor, such that a stream of refrigerant gas and liquid co-fluid can be circulated through said scroll compressor, said refrigeration system including a carbon dioxide refrigerant and a liquid co-fluid in which said carbon dioxide is differentially soluble and wherein said co-fluid is neopentylglycol diacetate.

22. A vapor compression refrigeration system comprising:
an orbital motion scroll compressor having an inlet and an outlet, said scroll compressor being for compressing gaseous refrigerant and for circulating refrigerant and liquid co-fluid through said refrigeration system;
a resorber/condenser connected to said outlet of said scroll compressor;
an expansion device connected to said resorber/condenser; and
a desorber/evaporator connected to said expansion device, said desorber/evaporator being connected to said inlet of said scroll compressor, such that a stream of refrigerant gas and liquid co-fluid can be circulated through said scroll compressor, said refrigeration system including a carbon dioxide refrigerant and a liquid co-fluid in which said carbon dioxide is differentially soluble and wherein the weight percentage of carbon dioxide compared to co-fluid measured after the resorber/condenser is between 5% and 50% by weight.

23. A vapor compression refrigeration system comprising:
an orbital motion scroll compressor having an inlet and an outlet, said scroll compressor being for compressing gaseous refrigerant and for circulating refrigerant and liquid co-fluid through said refrigeration system;
a resorber/condenser connected to said outlet of said scroll compressor;
an expansion device connected to said resorber/condenser; and
a desorber/evaporator connected to said expansion device, said desorber/evaporator being connected to said inlet of said scroll compressor, such that a stream of refrigerant gas and liquid co-fluid can be circulated through said scroll compressor, said refrigeration system including a carbon dioxide refrigerant and a liquid co-fluid in which said carbon dioxide is differentially soluble and wherein the weight percentage of carbon dioxide compared to co-fluid measured after the resorber/condenser is between 5% and 50% by weight and wherein said compressor is operative to compress said carbon dioxide/co-fluid mixture to a pressure between approximately 15 and 35 bar.

24. A refrigeration method comprising the steps of:
(a) compressing a stream of carbon dioxide gas and a liquid co-fluid to an increased gas pressure with a scroll compressor, such that said compressed carbon dioxide gas at least partially dissolves in said liquid co-fluid whereby said mixture of co-fluid and carbon dioxide has an equilibrium vapor pressure for 10% by weight carbon dioxide dissolved in said co-fluid of between approximately 6 and 15 bar at 40° C. and such that the heat of solution is at least partially released from said solution;
(b) reducing the pressure on said liquid co-fluid containing said dissolved carbon dioxide, such that dissolved carbon dioxide comes at least partly out of solution with said liquid co-fluid and such that the heat of solution is at least partially absorbed from the surroundings by said vaporizing carbon dioxide; and
(c) recirculating said stream of carbon dioxide gas and said liquid co-fluid to said scroll compressor.

25. A refrigeration method comprising the steps of:
(a) compressing a stream of carbon dioxide gas and a liquid co-fluid to an increased gas pressure with a scroll compressor, such that said compressed carbon dioxide gas at least partially dissolves in said liquid co-fluid, such that the heat of solution is at least partially released from said solution;
(b) reducing the pressure on said liquid co-fluid containing said dissolved carbon dioxide, such that dissolved carbon dioxide comes at least partly out of solution with said liquid co-fluid and such that the heat of solution is at least partially absorbed from the surroundings by said vaporizing carbon dioxide; and
(c) recirculating said stream of carbon dioxide gas and said liquid co-fluid to said scroll compressor, and wherein said co-fluid is a neopentylglycol diacetate.

26. A refrigeration method comprising the steps of:
(a) compressing a stream of carbon dioxide gas and a liquid co-fluid to an increased gas pressure with a scroll compressor, such that said compressed carbon dioxide gas at least partially dissolves in said liquid co-fluid, such that the heat of solution is at least partially released from said solution and such that the weight percentage of carbon dioxide compared to co-fluid measured after the carbon dioxide is dissolved in the co-fluid is between 5% and 50% by weight;
(b) reducing the pressure on said liquid co-fluid containing said dissolved carbon dioxide, such that dissolved carbon dioxide comes at least partly out of solution with said liquid co-fluid and such that the heat of solution is at least partially absorbed from the surroundings by said vaporizing carbon dioxide; and
(c) recirculating said stream of carbon dioxide gas and said liquid co-fluid to said scroll compressor.

27. A refrigeration method comprising the steps of:
(a) compressing a stream of carbon dioxide gas and a liquid co-fluid to an increased gas pressure with a scroll compressor such that said carbon dioxide/co-fluid mixture is compressed to a pressure between approximately 15 and 35 bar, and such that said compressed carbon dioxide gas at least partially dissolves in said liquid co-fluid, such that the heat of solution is at least partially released from said solution;
(b) reducing the pressure on said liquid co-fluid containing said dissolved carbon dioxide, such that dissolved carbon dioxide comes at least partly out of solution with said liquid co-fluid and such that the heat of solution is at least partially absorbed from the surroundings by said vaporizing carbon dioxide; and
(c) recirculating said stream of carbon dioxide gas and said liquid co-fluid to said scroll compressor.

28. A refrigeration system comprising a desorber/evaporator, a scroll compressor operatively connected to said desorber/evaporator, a resorber/condenser operatively connected to said compressor, an expansion device operatively connected to said resorber/condenser and to said desorber/evaporator and a circulating refrigerant, the improvement comprising said refrigerant comprising carbon dioxide and a liquid co-fluid in which said carbon dioxide is differentially soluble at resorber/condenser and desorber/evaporator conditions and wherein said co-fluid is a neopentylglycol.

29. A refrigeration system comprising a desorber/evaporator, a scroll compressor operatively connected to said desorber/evaporator, a resorber/condenser operatively connected to said compressor, an expansion device operatively connected to said resorber/condenser and to said desorber/evaporator and a circulating refrigerant, the improvement comprising said refrigerant comprising carbon dioxide and a liquid co-fluid in which said carbon dioxide is differentially soluble at resorber/condenser and desorber/evaporator conditions and wherein said co-fluid is a propyleneglycol.

30. A refrigeration system comprising a desorber/evaporator, a scroll compressor operatively connected to said desorber/evaporator, a resorber/condenser operatively connected to said compressor, an expansion device operatively connected to said resorber/condenser and to said desorber/evaporator and a circulating refrigerant, the improvement comprising said refrigerant comprising carbon dioxide and a liquid co-fluid in which said carbon dioxide is differentially soluble at resorber/condenser and desorber/evaporator conditions and wherein said scroll compressor is operatively connected to an internal combustion engine.

31. A refrigeration system comprising a desorber/evaporator, a scroll compressor operatively connected to said desorber/evaporator, a resorber/condenser operatively connected to said compressor, an expansion device operatively connected to said resorber/condenser and to said desorber/evaporator and a circulating refrigerant, the improvement comprising said refrigerant comprising carbon dioxide and a liquid co-fluid in which said carbon dioxide is differentially soluble at resorber/condenser and desorber/evaporator conditions and wherein said scroll compressor is operatively connected to an automobile engine.

32. A refrigeration system comprising a desorber/evaporator, a scroll compressor operatively connected to said desorber/evaporator, a resorber/condenser operatively connected to said compressor, an expansion device operatively connected to said resorber/condenser and to said desorber/evaporator and a circulating refrigerant, the improvement comprising said refrigerant comprising carbon dioxide and a liquid co-fluid in which said carbon dioxide is differentially soluble at resorber/condenser and desorber/evaporator conditions and wherein said scroll compressor is operatively connected to a gas-driven engine.

* * * * *